US 8,122,046 B2

(12) United States Patent
Chang et al.

(10) Patent No.: US 8,122,046 B2
(45) Date of Patent: *Feb. 21, 2012

(54) METHOD AND APPARATUS FOR QUERY REWRITE WITH AUXILIARY ATTRIBUTES IN QUERY PROCESSING OPERATIONS

(75) Inventors: Yuan-Chi Chang, New York, NY (US); Matthew L. Hill, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 757 days.

This patent is subject to a terminal disclaimer.

(21) Appl. No.: 11/852,705

(22) Filed: Sep. 10, 2007

(65) Prior Publication Data

US 2007/0299832 A1 Dec. 27, 2007

Related U.S. Application Data

(63) Continuation of application No. 10/668,549, filed on Sep. 23, 2003, now Pat. No. 7,587,394.

(51) Int. Cl.
*G06F 17/30* (2006.01)

(52) U.S. Cl. ........................................ 707/764; 707/767
(58) Field of Classification Search .................. 707/2–5, 707/999.002–999.006, 764–767
See application file for complete search history.

(56) References Cited

U.S. PATENT DOCUMENTS

| 6,169,986 B1 * | 1/2001 | Bowman et al. | 1/1 |
| 6,446,061 B1 * | 9/2002 | Doerre et al. | 707/738 |
| 6,581,056 B1 * | 6/2003 | Rao | 707/5 |
| 6,941,297 B2 * | 9/2005 | Carmel et al. | 707/3 |
| 2002/0069190 A1 * | 6/2002 | Geiselhart | 707/1 |

FOREIGN PATENT DOCUMENTS

| JP | 10269248 | 10/1998 |
| JP | 2002140364 | 5/2002 |

OTHER PUBLICATIONS

G. Graefe, "Query Evaluation Techniques for Large Databases," ACM Computing Surveys, vol. 25, No. 2, pp. 73-170, Jun. 1993.
D. Kossmann, "The State of the Art in Distributed Query Processing," ACM Computing Surveys, vol. 32, No. 4, pp. 422-469, Dec. 2000.
L.M. Haas et al., "Extensible Query Processing in Starburst," ACM SIGMOD Record, vol. 18, No. 2, pp. 377-388, Jun. 1989.
G. Graefe et al., "Dynamic Query Evaluation Plans," ACM SIGMOD Record, vol. 18, No. 2, pp. 358-366, Jun. 1989.
D. Kossmann et al., "Iterative Dynamic Programming: A New Class of Query Optimization Algorithms," ACM Transactions on Database Systems, vol. 25, No. 1, pp. 43-82, Mar. 2000.

* cited by examiner

*Primary Examiner* — Apu Mofiz
*Assistant Examiner* — Monica Pyo
(74) *Attorney, Agent, or Firm* — Anne V. Dougherty; Ryan, Mason & Lewis, LLP

(57) ABSTRACT

Methods and apparatus are provided for rewriting queries during a database query processing operation to include auxiliary attributes not included in the original query, thus improving processing efficiency. For example, in one aspect of the invention, a technique for rewriting a query in a query processing operation includes the following steps. First, the query is processed in accordance with at least a portion of a data set, producing query results. Second, data attributes from the query results are analyzed. Finally, at least one new predicate from at least one auxiliary data attribute is appended on the query.

18 Claims, 3 Drawing Sheets

| DATE | WESTCHESTER | NEW YORK CITY | TEMPERATURE |
|---|---|---|---|
| JULY 2 | 1234 | 2345 | 91 |
| JULY 3 | 1345 | 2456 | 95 |
| MAY 2 | 789 | 890 | 60 |
| MAY 3 | 567 | 678 | 55 |

108 — SELECT DATE FROM TABLE WHERE WESTCHESTER + NEW YORK CITY > 3000

METHOD AND APPARATUS FOR QUERY REWRITE WITH AUXILIARY ATTRIBUTES IN QUERY PROCESSING OPERATIONS

CROSS-REFERENCE TO RELATED APPLICATION(S)

This application is a continuation of U.S. application Ser. No. 10/668,549 filed on Sep. 23, 2003, the disclosure of which is incorporated herein by reference.

FIELD OF THE INVENTION

The present invention is related to query processing operations in databases and other information systems and, more particularly, to rewriting queries during database query processing operations to include a new predicate from a data attribute.

BACKGROUND OF THE INVENTION

Due to an increase in the amount of online business transactions, efficiency in the query processing of large amounts of data stored in databases, data warehouses, and other information systems, has become increasingly important. Since the late 1970s, research and development activities have persisted throughout academia and industry in studying efficient query processing operations in standalone databases, distributed databases, hierarchical databases, spatial databases, and databases on the World Wide Web. Comprehensive reviews of reported query processing techniques have been provided in several sources, see, e.g., G. Graefe, "Query Evaluation Techniques for Large Databases," ACM Computing Surveys, Volume 25 Issue 2, June 1993; and D. Kossmann, "The State of the Art in Distributed Query Processing," ACM Computing Surveys, Volume 32 Issue 4, December 2000.

Database query processing operations typically consist of six phases: parsing, semantic checking, query rewrite, plan optimization, plan refinement, and query evaluation. The reasons for rewriting a query in query processing operations have been described in several references, see, e.g., L. M. Haas et al., "Extensible Query Processing in Starburst," ACM SIGMOD Record, Volume 18 Issue 2, June 1989. Some reasons for query rewrite include:

1. Alternative phrasing of a query: Since relational query languages are nonprocedural, the alternatives perform equivalently; and
2. Involvement of view abstractions in a query: Since view definitions are hidden from the query writer, a query involving views can only be expanded by the database.

Traditional query rewrite strategies focus on rewrite and optimization for attributes that appear in query predicates, see, e.g., G. Graefe et al., "Dynamic Query Evaluation Plans," ACM SIGMOD Record, Volume 18 Issue 2, June 1989; and D. Kossmann et al., "Iterative Dynamic Programming: A New Class of Query Optimization Algorithms," ACM Transactions on Database Systems, Volume 25 Issue 1, March 2000.

SUMMARY OF THE INVENTION

Principles of the invention provide techniques for rewriting queries during query processing operations.

For example, in one aspect of the invention, a technique for rewriting a query during a database query processing operation includes the following steps. First, the query is processed in accordance with at least a portion of a data set, producing query results. Second, data attributes from the query results are analyzed. Finally, a new predicate from a data attribute is appended on the query. Thus, advantageously a new predicate relating to a data attribute not included in the original query may be appended on the query, thus improving processing efficiency.

Several major differences exist between the principles of the invention and traditional methodologies. For example, principles of the invention: (i) may advocate a query rewrite strategy to append new predicates based on attributes absent from the original query; (ii) may employ a two-pass query processing operation approach as opposed to the prevalent single-pass processing; (iii) may employ statistical analysis and other data mining techniques to help identify distinguishing attributes; and (iv) may have false dismissals due to query rewrite, while traditional methodologies emphasize exact answers.

Thus, principles of the invention propose at least one additional reason for query rewrite that is distinct from traditional query normalization approaches. This distinct reason is to leverage the knowledge about auxiliary attributes in data records to append additional query predicates for more efficient processing. Advantageously, the inventive technique may be useful for providing efficient query processing operations in large databases, while maintaining the accuracy of results. This efficiency translates a normally high processing cost query into a low cost query.

These and other objects, features, and advantages will become apparent from the following detailed description of illustrative embodiments thereof, which is to be read in connection with the accompanying drawings.

DETAILED DESCRIPTION OF PREFERRED EMBODIMENTS

The following description will illustrate principles of the invention using an exemplary data processing system architecture. Principles of the invention are not limited to use with any particular system architecture. Instead it is more generally applicable to any data processing system in which it is desirable to perform efficient and effective query processing operations.

The term "database," as used herein, is intended to include any data storage software and systems, such as, for example, a relational database like IBM DB2 and Oracle 9. The term "data record," as used herein, is intended to include any logical structured association of data in a database, such as, for example, a row in a table of a relational database. The terms "attribute" and "data attribute," as used herein, are intended to include any element of a data record, such as, for example, a column value of a row. The term "target attribute," as used herein, is intended to refer to any attribute that explicitly appears in a user query. The term "auxiliary attribute," as used herein, is intended to refer to any attribute that is missing from a user query.

Principles of the invention are applicable to query processing operations on a database or other information system that stores structured data records with one or more attributes. For ease of illustration and description, an example based on query processing operations on a database table is used in the preferred embodiment of the present invention. The present invention should not be viewed as limited or constrained to processing on database tables.

Figures 1, 2:
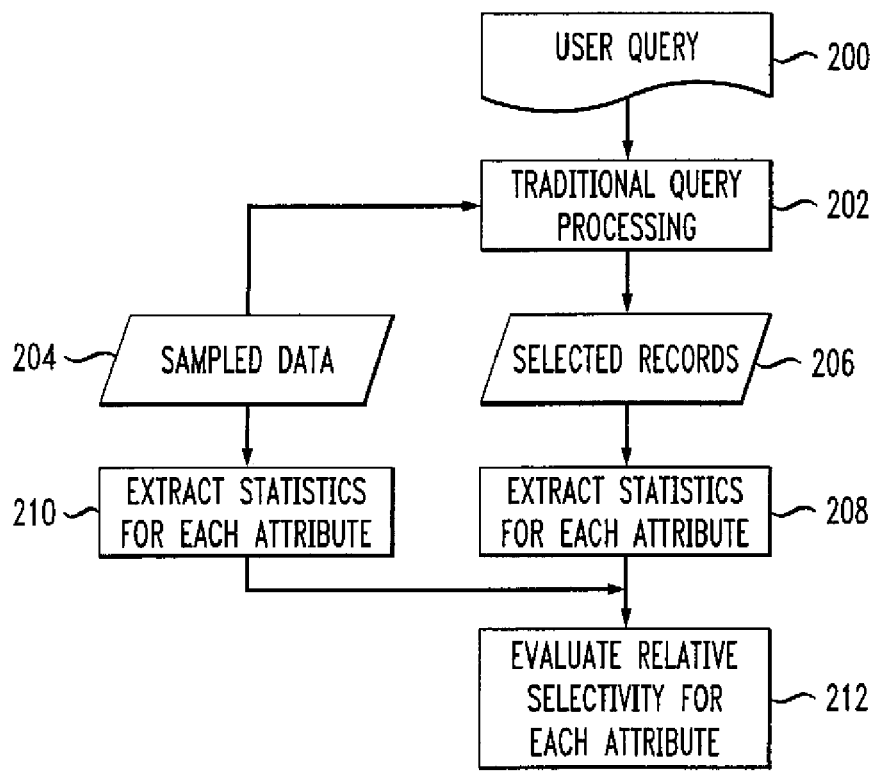
FIG. 1 is a table illustrating electricity usage data stored in a database, for use in explaining distinctions between principles of the invention and traditional methodologies.
FIG. 2 is a flow diagram illustrating a first pass query execution methodology, according to an embodiment of the present invention.

Referring initially to FIG. 1, a table illustrates electricity usage data stored in a database, for use in explaining distinctions between the principles of the invention and traditional methodologies. The table has four attribute labels in its header row; reporting date 100, Westchester electricity usage 102, New York City electricity usage 104, and temperature 106. An exemplary query 108 asks for dates having a total daily electricity usage above 3000 MegaWatt for these two geographic areas. In this instance, the total daily electricity usage is computed by adding the daily electricity usage of New York City (NYC) to the daily electricity usage of Westchester County, NY. Thus, the query statement has a single predicate regarding the sum of the values for Westchester electricity usage 102 and NYC electricity usage 104 being greater than 3000 MW for a reporting date 100.

Traditional query rewrite focuses on attribute columns, such as reporting date 100, Westchester electricity usage 102, and NYC electricity usage 104. However, through the analysis of attribute value distributions, it may be discovered that the total electricity usage is above 3000 MW only when the outdoor temperature is above 90° F. The temperature attribute, which is not specified in the original query, is auxiliary, but can significantly reduce query processing time by adding an additional predicate to the query. It would thus be beneficial to include the temperature predicate at the query rewrite phase. However, traditional query rewrite strategies have not included predicates on auxiliary attributes as proposed by principles of the invention.

The query rewrite methodology proposed in the present invention includes two passes. The first pass discovers attributes that have a high selectivity from an analysis of query results from sampled data. The second pass selects top-ranked auxiliary attributes and appends new predicates relating to the selected attributes to the original query for improved query efficiency.

Referring now to FIG. 2, a flow diagram illustrates a first pass query execution methodology, according to an embodiment of the present invention. The methodology begins by inputting a user query 200. A traditional, unmodified query processing operation is first used to execute user query 200 on sampled data 204 from a dataset in step 202. Results of user query 200 are returned as selected data records 206. Statistics for each attribute value of selected data records 206 are extracted in step 208. Separately, statistics for identical attributes are collected and extracted from sampled data 204 in step 210. The sets of statistics from steps 208 and 210, are evaluated in step 212. This evaluation is described in further detail in FIG. 4.

In accordance with principles of the invention, for numerical attributes, typical statistics extracted in steps 208 and 210 may include a maximum, a minimum, a median, an average, and a standard deviation. For categorical attributes, the extracted statistics in steps 208 and 210 may include the number of distinct values and the aggregated counts for each value. Higher order statistics involving joint statistics of two or more attributes can also be extracted. In this embodiment, the present invention applies the maximum and minimum values of numerical attributes but its scope is not limited to the aforementioned statistics.

Figure 3:
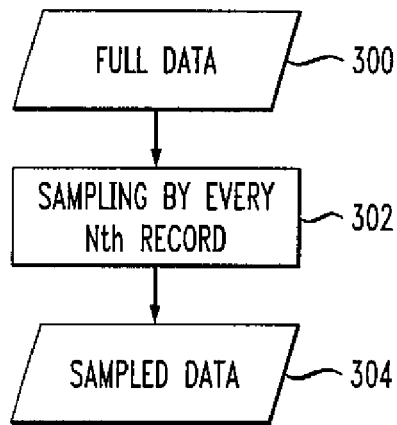
FIG. 3 is a flow diagram illustrating a data sampling methodology, according to an embodiment of the present invention.

Referring now to FIG. 3, a flow diagram illustrates a data sampling methodology, according to an embodiment of the present invention. This can be considered a detailed description of the acquisition of sampled data 204 in FIG. 2. This methodology reduces the number of data records for the first-pass query processing operation of FIG. 2. Every Nth record of a full data set 300 is sampled in step 302 resulting in a sampled data set 304. N is typically in the range of 10 to 100. The resulting records of sampled data set 304 are stored in a smaller temporary database.

Figure 4:
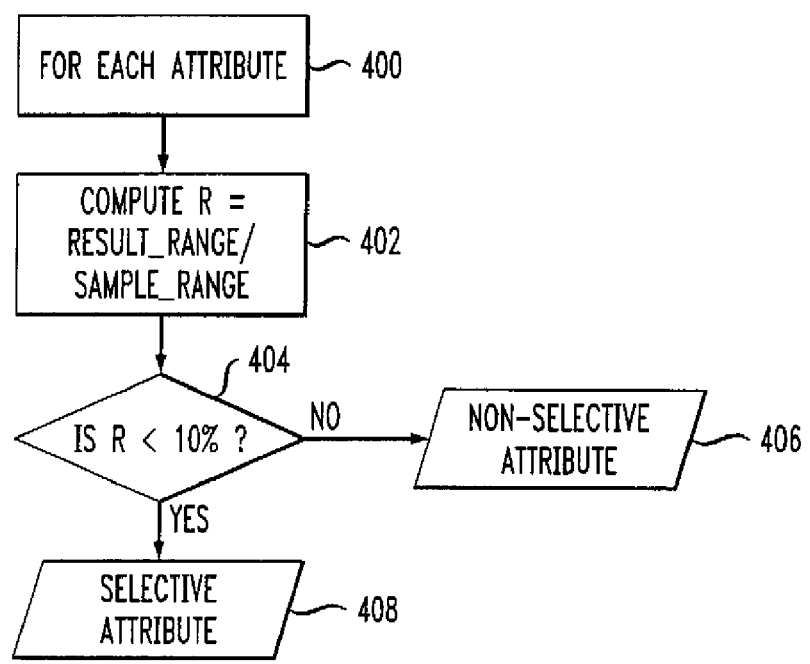
FIG. 4 is a flow diagram illustrating a selective attribute selection methodology, according to an embodiment of the present invention.

Referring now to FIG. 4, a flow diagram illustrates a selective attribute selection methodology, according to an embodiment of the present invention. This methodology may be considered a detailed description of step 212 in FIG. 2. The methodology illustrates a preferred evaluation method to identify selective attributes. However, principles of the invention are not limited to this particular evaluation and is applicable to other evaluation criteria. In FIG. 4, each numerical attribute, input in step 400, is examined by comparing the dynamic ranges of attribute statistics from sampled data to attribute statistics from query results. Both target and auxiliary attributes are examined. The dynamic range of an attribute may be defined as the difference between the maximum and minimum values. Step 402 computes a ratio R for the two dynamic ranges. In step 404, it is determined whether R is smaller than 10%. If R is smaller than 10% the attribute is selective 408. Otherwise, the attribute is non-selective 406. The threshold for R is preferably at or below 10%.

Figure 5:
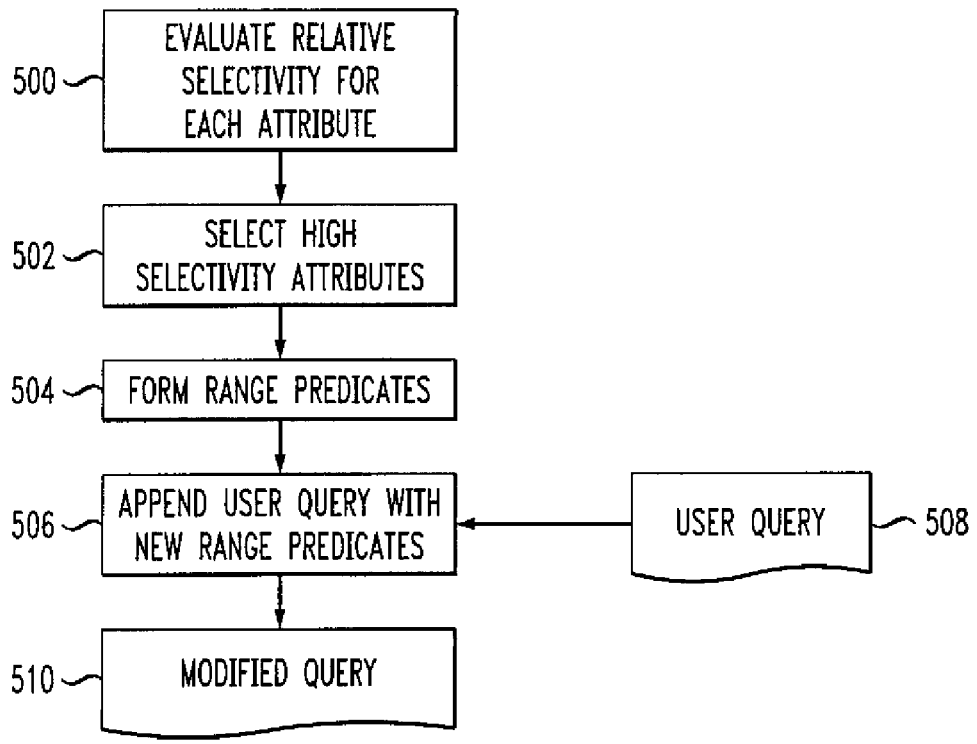
FIG. 5 is a flow diagram illustrating a query rewrite methodology, according to an embodiment of the present invention.

Referring now to FIG. 5, a flow diagram illustrates a query rewrite methodology and second query pass, according to an embodiment of the present invention. The methodology begins at step 500 where the relative selectivity for each selective attribute is evaluated. These selective attributes 408 were discovered in step 404 of FIG. 4. The second query pass begins by selecting high selectivity attributes in step 502. There may be multiple selective attributes, which are ranked in ascending order by the value of R. A small R value is preferred because it indicates higher selectivity and higher efficiency. Depending on specific query scenarios, one or more top-ranked attributes are selected. Range predicates are then formed in step 504. The dynamic ranges of selected attributes from query results form new range predicates by bounding the minimum and maximum values. For example, the temperature attribute in FIG. 1 has a maximum value 95 and a minimum value 91 for dates whose total electric usage is above 3000 MW. The range predicate of temperature becomes [91, 95]. User query 508 is then appended with new range (temperature) predicates in step 506. The methodology terminates with the resulting modified query 510, such as, for example, "Select date from table where Westchester+NewYorkCity>3000 AND temperature<=95 and temperature>=91." The newly appended query 510 is then passed to the traditional query processing operation and optimization, which will use the newly appended, highly selective predicates to reduce the processing time.

In accordance with the present invention, the appended query may not yield the same set of results as the original query. This is because the sampling step in FIG. 3 may miss outliers in the data records which are not included in the attribute selection and predicate construction. However, an appended query and its original query yield identical results in many practical applications, such as in the electricity usage query example. The samples in those applications usually have less noise and smoother variations.

Figure 6:
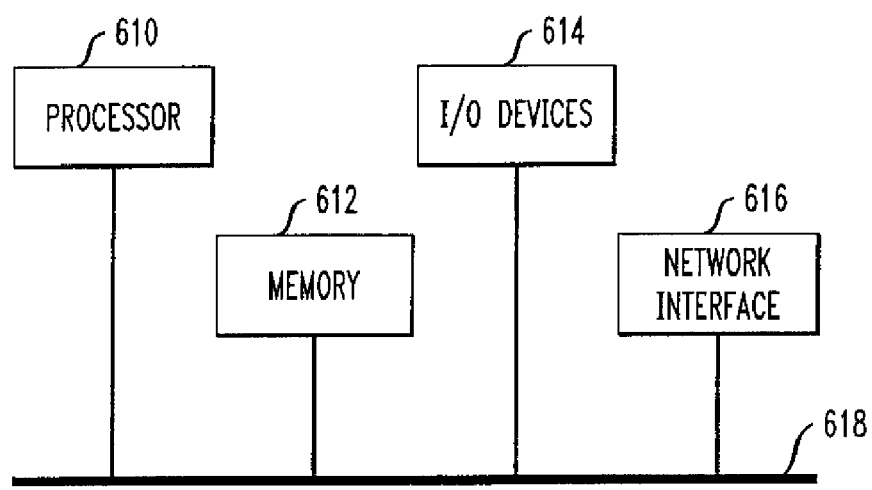
FIG. 6 is a diagram illustrating an illustrative hardware implementation of a computing system in accordance with which one or more components/methodologies of the present invention may be implemented, according to an embodiment of the present invention.

Referring now to FIG. 6, a block diagram illustrates an illustrative hardware implementation of a computing system in accordance with which one or more components/methodologies of the invention (e.g., components/methodologies described in the context of FIGS. 1 through 5) may be implemented, according to an embodiment of the present invention. For instance, such a computing system in FIG. 6 may implement a database and process user query 204 of FIG. 2.

It is to be understood that such individual components/methodologies may be implemented and processed on one such computer system, or on more than one such computer system. For instance, user query 204 may be processed on one computer system (e.g., client device), while the database may be implemented on another computer system. In the case of an implementation in a distributed computing system, the individual computer systems and/or devices may be connected via a suitable network, e.g., the Internet or World Wide Web. However, the system may be realized via private or local networks. The invention is not limited to any particular network.

As shown, the computer system may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol (e.g., HTTP/S).

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, the invention is not limited to those precise embodiments, and that various other changes and modifications may be made by one skilled in the art without departing from the scope or spirit of the invention.

What is claimed is:

1. Apparatus for rewriting a query during a database query processing operation, comprising:
    a memory; and
    at least one processor coupled to the memory and operative to: (i) process the query having one or more target attributes in accordance with at least a portion of a data set producing query results comprising the one or more target attributes and one or more auxiliary attributes, wherein the one or more auxiliary attributes are not included in the query; (ii) compare the query results to at least the portion of the data set to determine a relative selectivity for the one or more auxiliary attributes; and (iii) append the query with at least one new predicate corresponding to at least one of the one or more auxiliary attributes having a high relative selectivity to form a rewritten query;
    wherein the operation of appending the query with at least one new predicate comprises:
    selecting at least one of the one or more auxiliary attributes based at least in part on a ranking of the determined relative selectivity for the one or more auxiliary attributes; and
    appending the query with at least one new predicate corresponding to the selected at least one of the one or more auxiliary attributes to form the rewritten query.

2. The apparatus of claim 1, wherein at least the portion of the data set comprises sampled records from the data set.

3. The apparatus of claim 2, wherein the processor is further operative to sample data records from the data set.

4. The apparatus of claim 3, wherein the operation of sampling data records comprises sampling every Nth record from the data set, wherein N is a positive integer greater than or equal to two.

5. The apparatus of claim 1, wherein the operation of comparing the query results to at least the portion of the data set comprises:
    extracting statistics for the one or more auxiliary attributes from the query results;
    extracting statistics for the one or more auxiliary attributes from at least the portion of the data set; and
    evaluating the relative selectivity for the one or more auxiliary attributes by comparing the extracted statistics from the query results to the extracted statistics from at least the portion of the data set.

6. The apparatus of claim 5, wherein the operation of evaluating the relative selectivity comprises:
    comparing a range of statistics for the one or more auxiliary attributes from the query results to a range of statistics to a corresponding attribute from at least the portion of the data set.

7. The apparatus of claim 1, wherein the operation of appending the query with at least one new predicate comprises:
    selecting at least one auxiliary data attribute with a high relative selectivity;
    forming at least one new predicate; and
    appending the query with the at least one new predicate.

8. The apparatus of claim 1, wherein the at least one processor is further operative to perform a query processing operation on the data set with a rewritten query.

9. A method for rewriting a query during a database query processing operation, comprising the steps of:
    processing the query having one or more one or more target attributes in accordance with at least a portion of a data set producing query results comprising the one or more target attributes and one or more auxiliary attributes, wherein the one or more auxiliary attributes are not included in the query;

comparing the query results to at least the portion of the data set to determine a relative selectivity for the one or more auxiliary attributes; and appending the query with at least one new predicate corresponding to at least one of the one or more auxiliary attributes having a high relative selectivity to form a rewritten query;

wherein the step of appending the query with at least one new predicate comprises:

selecting at least one of the one or more auxiliary attributes based at least in part on a ranking of the determined relative selectivity for the one or more auxiliary attributes; and appending the query with at least one new predicate corresponding to the selected at least one of the one or more auxiliary attributes to form the rewritten query.

10. The method of claim 9, wherein at least the portion of the data set comprises sampled records from the data set.

11. The method of claim 9, further comprising the step of sampling data records from the data set.

12. The method of claim 9, wherein the step of sampling data records comprises sampling every Nth record from the data set, wherein N is a positive integer greater than or equal to two.

13. The method of claim 9, wherein the step of comparing the query results to at least the portion of the data set comprises:

extracting statistics for the one or more auxiliary attributes from the query results;

extracting statistics for the one or more auxiliary attributes from at least the portion of the data set; and evaluating the relative selectivity for the one or more auxiliary attributes by comparing the extracted statistics from the query results to the extracted statistics from at least the portion of the data set.

14. The method of claim 13, wherein the step of evaluating the relative selectivity comprises:

comparing a range of statistics for the one or more auxiliary attributes from the query results to a range of statistics to a corresponding attribute from at least the portion of the data set; and comparing a ratio of the ranges to a predetermined value.

15. The method of claim 9, wherein the step of appending the query with at least one new predicate comprises:

selecting at least one auxiliary data attribute with a high relative selectivity;

forming at least one new predicate; and appending the query with the at least one new predicate.

16. The method of claim 9, further comprising the step of performing a query processing operation on the data set with a rewritten query.

17. An article of manufacture for rewriting a query during a database query processing operation; comprising a machine readable storage medium containing one or more programs which when executed implement the steps of:

processing the query having one or more one or more target attributes in accordance with at least a portion of a data set producing query results comprising the one or more target attributes and one or more auxiliary attributes, wherein the one or more auxiliary attributes are not included in the query;

comparing the query results to at least the portion of the data set to determine a relative selectivity for the one or more auxiliary attributes; and appending the query with at least one new predicate corresponding to at least one of the one or more auxiliary attributes having a high relative selectivity to form a rewritten query;

wherein the step of appending the query with at least one new predicate comprises:

selecting at least one of the one or more auxiliary attributes based at least in part on a ranking of the determined relative selectivity for the one or more auxiliary attributes; and appending the query with at least one new predicate corresponding to the selected at least one of the one or more auxiliary attributes to form the rewritten query.

18. The apparatus of claim 6, wherein the operation of evaluating the relative selectivity further comprises comparing a ratio of the ranges to a predetermined value.

* * * * *